(12) United States Patent
Kurtzeborn et al.

(10) Patent No.: US 7,644,314 B2
(45) Date of Patent: Jan. 5, 2010

(54) RETROACTIVE VERBOSE LOGGING

(75) Inventors: Scott E. Kurtzeborn, Redmond, WA (US); Mark L. Epstein, Seattle, WA (US); Aidan T. Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 11/390,904

(22) Filed: Mar. 28, 2006

(65) Prior Publication Data

US 2007/0255978 A1 Nov. 1, 2007

(51) Int. Cl.
*G06F 11/00* (2006.01)
(52) U.S. Cl. .............................. 714/38; 714/45; 717/174
(58) Field of Classification Search .................... 714/38, 714/45; 717/174
See application file for complete search history.

(56) References Cited

U.S. PATENT DOCUMENTS

| | | | |
|---|---|---|---|
| 5,245,615 A | 9/1993 | Treu | 371/16.5 |
| 6,173,420 B1* | 1/2001 | Sunkara et al. | 714/38 |
| 6,802,054 B2 | 10/2004 | Faraj | 717/128 |
| 6,862,711 B1 | 3/2005 | Bahrs et al. | 715/526 |
| 6,968,509 B1 | 11/2005 | Chang et al. | 715/802 |
| 7,147,370 B2* | 12/2006 | Xiaodong et al. | 378/206 |
| 7,395,513 B2* | 7/2008 | Zimniewicz et al. | 715/841 |
| 2002/0100023 A1 | 7/2002 | Ueki et al. | 717/127 |
| 2003/0037257 A1 | 2/2003 | Wang | 713/200 |
| 2003/0051235 A1* | 3/2003 | Simpson | 717/174 |
| 2004/0015880 A1 | 1/2004 | Floyd et al. | 717/128 |
| 2004/0078693 A1 | 4/2004 | Kellett | 714/38 |
| 2004/0194114 A1 | 9/2004 | Spiegel | 719/318 |
| 2005/0125788 A1* | 6/2005 | Lupini et al. | 717/174 |
| 2005/0268187 A1 | 12/2005 | Meaney et al. | 714/723 |
| 2006/0050658 A1* | 3/2006 | Shaffer et al. | 370/261 |
| 2006/0168165 A1* | 7/2006 | Boss et al. | 709/221 |
| 2007/0220032 A1* | 9/2007 | Kapoor et al. | 707/102 |
| 2007/0255978 A1* | 11/2007 | Kurtzeborn et al. | 714/38 |
| 2008/0005735 A1* | 1/2008 | Curtis | 717/174 |
| 2008/0215931 A1* | 9/2008 | Boss et al. | 714/57 |

FOREIGN PATENT DOCUMENTS

EP  1 492 008 A2  12/2004

OTHER PUBLICATIONS

John P. Rouillard, "Real-time Log File Analysis Using the Simple Event Correlator (SEC)," 2004 LISA XVIII—Nov. 14-19, 2004, Atlanta, Georgia, pp. 133-150.
Mohammad El-Ramly et al., "Modeling the System-User Dialog Using Interaction Traces," 1095-1350/01, 2001 IEEE, pp. 208-217.
C.W. Oehlrich, "Performance Evaluation of a Communication System for Transputer-Networks Based on Monitored Event Traces," 1991, ACM 0-89791-394-9/91/0005/0202, pp. 202-211.

* cited by examiner

*Primary Examiner*—Emerson C Puente
(74) *Attorney, Agent, or Firm*—Mercahnt & Gould

(57) ABSTRACT

Retroactive verbose error logging may be provided. Loggable event entries associated with software installation during installation may be saved. Each of the loggable event entries may have a first level or a second level. In addition, the loggable event entries associated with the first level and the second level may be saved to a log file if an error occurs during the software installation. Furthermore, the loggable event entries associated only with the first level may be saved to the log file if a milestone occurs during the software installation and the error has not occurred before the milestone occurs. The software installation may be stopped if the error occurs during the software installation and the software installation may continue if the milestone occurs during the software installation.

20 Claims, 3 Drawing Sheets

RETROACTIVE VERBOSE LOGGING

BACKGROUND

Verbose logging is a computer logging mode that records, during software installation for example, more information than a standard logging mode. (For example, verbose means "using more words than necessary".) Verbose logging options are usually enabled for troubleshooting because they create large detailed log files, however, they can also slow down a computer's performance.

In conventional systems, when errors are encountered during a software program's installation in which verbose logging is not enabled, a user, running a setup program installing the software program, must re-run the setup program. Before the re-run, however, the user must set a verbose logging mode in the setup program. During the re-run, the user must encounter the same error as during the first run to get a useful log file (now with verbose logging enabled) in order to understand the error's cause.

In other conventional systems, a setup controller, associated with a setup program installing a software program, writes a registry key on any error. This is done so that the next time the setup program runs, the error can be detected based on the written registry key. In this way, during the setup program's second run, the setup program may log verbosely for the entire software program installation.

Accordingly, the conventional strategy is to wait and see if an error occurs when running a setup program installing a software program. If an error occurs, then the setup program is run again with verbose logging set during the second run. This often causes problems because the conventional strategy requires the setup program to run twice and for the user to manually set verbose logging. Great inefficiencies occur with the conventional strategy at least due to the time required for the setup program installing the software program to run twice.

SUMMARY

Retroactive verbose error logging may be provided. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one embodiment, a method for providing error logging may comprise saving loggable event entries associated with software installation during installation of the software. Each of the loggable event entries may have one of the following: a first level and a second level. The loggable event entries associated with the first level and the second level may be saved to a log file if an error occurs during the software installation. Furthermore, the loggable event entries associated only with the first level may be saved to the log file if a milestone occurs during the software installation and if the error has not occurred before the milestone occurs.

According to another embodiment, a system for providing error logging may comprise a memory storage and a processing unit coupled to the memory storage. The processing unit may be operative to save loggable event entries associated with software installation during installation. Each of the loggable event entries may have one of the following: a first level and a second level. The processing unit may also be operative to save the loggable event entries associated with the first level and the second level to a log file if an error occurs during the software installation. In addition, the processing unit may be operative to save the loggable event entries associated only with the first level to the log file if a milestone occurs during the software installation and if the error has not occurred before the milestone occurs. Moreover, the processing unit may be operative to stop the software installation if the error occurs during the software installation and to continue the software installation if the milestone occurs during the software installation.

In accordance with yet another embodiment, a computer-readable medium which stores a set of instructions which when executed performs a method for providing error logging. The method may be executed by the set of instructions comprising saving, to a data structure in a volatile memory, loggable event entries associated with software installation during software installation. Each of the loggable event entries may have one of the following: a first level and a second level. The set of instructions may further comprise saving the loggable event entries associated with the first level and the second level to a log file if an error occurs during the software installation. Also, the set of instructions may comprise saving the loggable event entries associated only with the first level to the log file if a milestone occurs during the software installation and if the error has not occurred before the milestone occurs.

Both the foregoing general description and the following detailed description provide examples that are explanatory and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
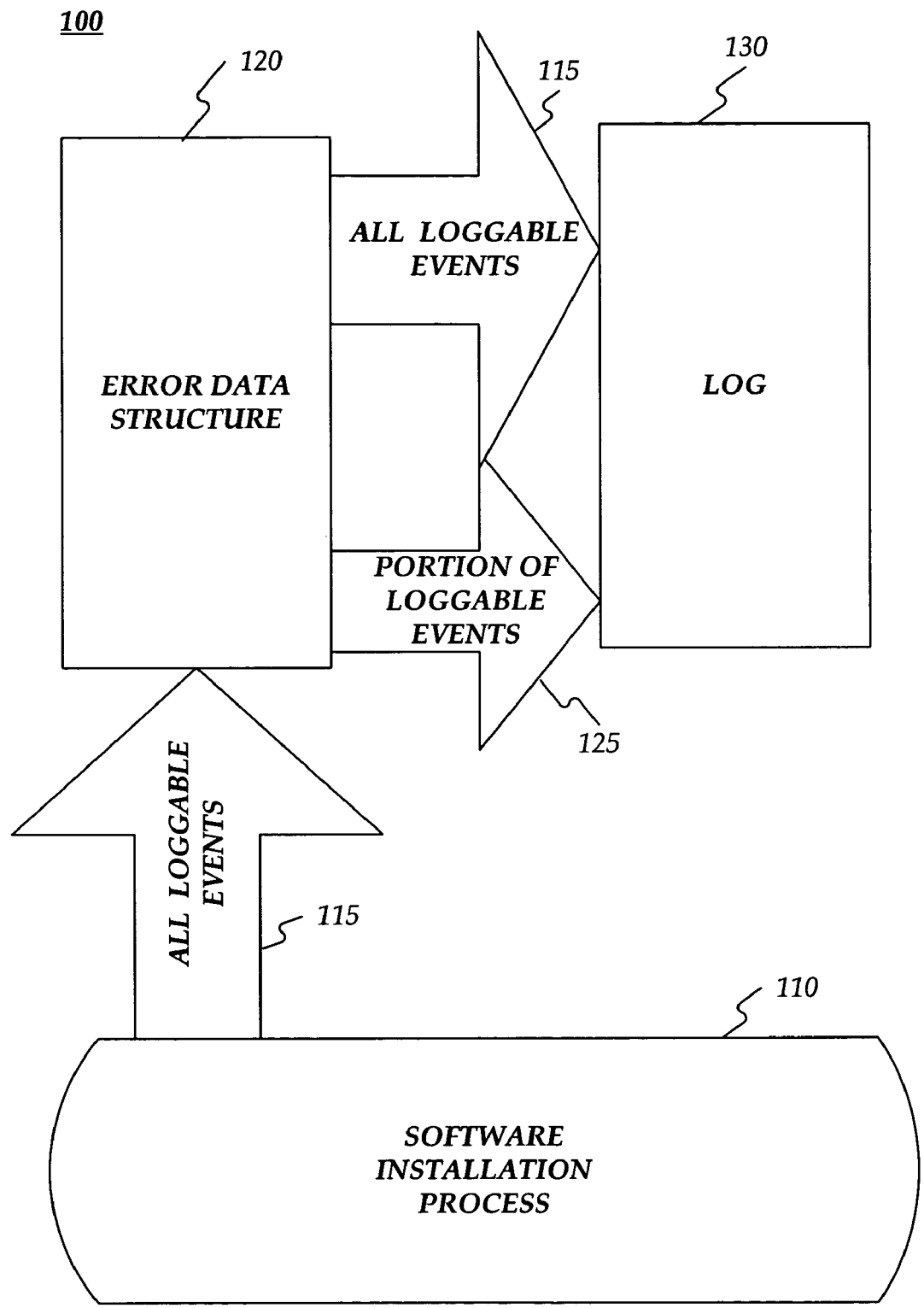
FIG. 1 is a block diagram of a system for providing error logging.

The following detailed description refers to the accompanying drawings. Wherever possible, the same reference numbers are used in the drawings and the following description to refer to the same or similar parts. While several embodiments and features of the invention are described herein, modifications, adaptations and other implementations are possible, without departing from the spirit and scope of the invention. For example, substitutions, additions or modifications may be made to the components illustrated in the drawings, and the methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide retroactive verbose error logging. FIG. 1 is a block diagram of a system 100 for providing error logging. Consistent with embodiments of the present invention, an error logging level may change (e.g. from "standard" to "verbose") during a software installation process 110 when an install error event occurs. Consequently, useful information surrounding the install error may be obtained without bloating a log 130 with useless information when no error occurs in software installation process 110.

Consistent with embodiments of the present invention, software installation process 110 may save all loggable events 115 that occur to an error data structure 120. Each event in all loggable events 115 may have an event level such as standard and verbose. These event levels are described in more detain below. As software installation process 110 progresses through "milestones" successfully, software installation process 110 may clear some of error data structure 120, leaving only a portion of loggable events 125. Portion of loggable events 125 may include only those events with the standard event level. After this clearing, portion of loggable events 125 may be stored to disk in log 130. If an error occurred in software installation process 110, however, no portion of error data structure 120 is cleared and all loggable events 115 may be stored to disk in log 130. Accordingly, when an error occurs, the more robust all loggable events 115 may be stored to disk in log 130 quickly before the system completely crashes. Log 130 may be studied latter for possible error diagnosis or debugging.

Consequently, a completely successful software installation may cause a very short understandable log 130 to be created. This has the performance benefits of: i) not wasting time performing disk writes to log 130 during a successful install, and ii) causing less fragmentation to a user's hard drive (if the user was installing and logging to the same physical disk drive). Furthermore, embodiments of the invention may include the benefit of preserving all contextual information in memory so that, in the event of an error, all of that information can be logged for later use in diagnosing the failure's cause. If no error is encountered, however, the majority of all loggable events 115 in error data structure 120 can be thrown out (and not written to log 130) because they may no longer be useful and not worth writing to log 130.

Unlike conventional systems, embodiments of the present invention do not require a user to fail an installation program and then run the installation program again to get a verbose error log. In effect, embodiments of the present invention may cause the logging to become retroactively verbose, for example, in a real time manner as soon as an error is encountered.

An embodiment consistent with the invention may comprise a system for providing error logging. The system may comprise a memory storage and a processing unit coupled to the memory storage. The processing unit may be operative to save loggable event entries associated with software installation during installation. Each of the loggable event entries may have a first level or a second level. The processing unit may be further operative to save the loggable event entries associated with the first level and the second level to a log file if an error occurred during the software installation. And the processing unit may also be operative to save the loggable event entries associated only with the first level to the log file if a milestone occurs during the software installation and the error has not occurred before the milestone occurs.

Figure 2:
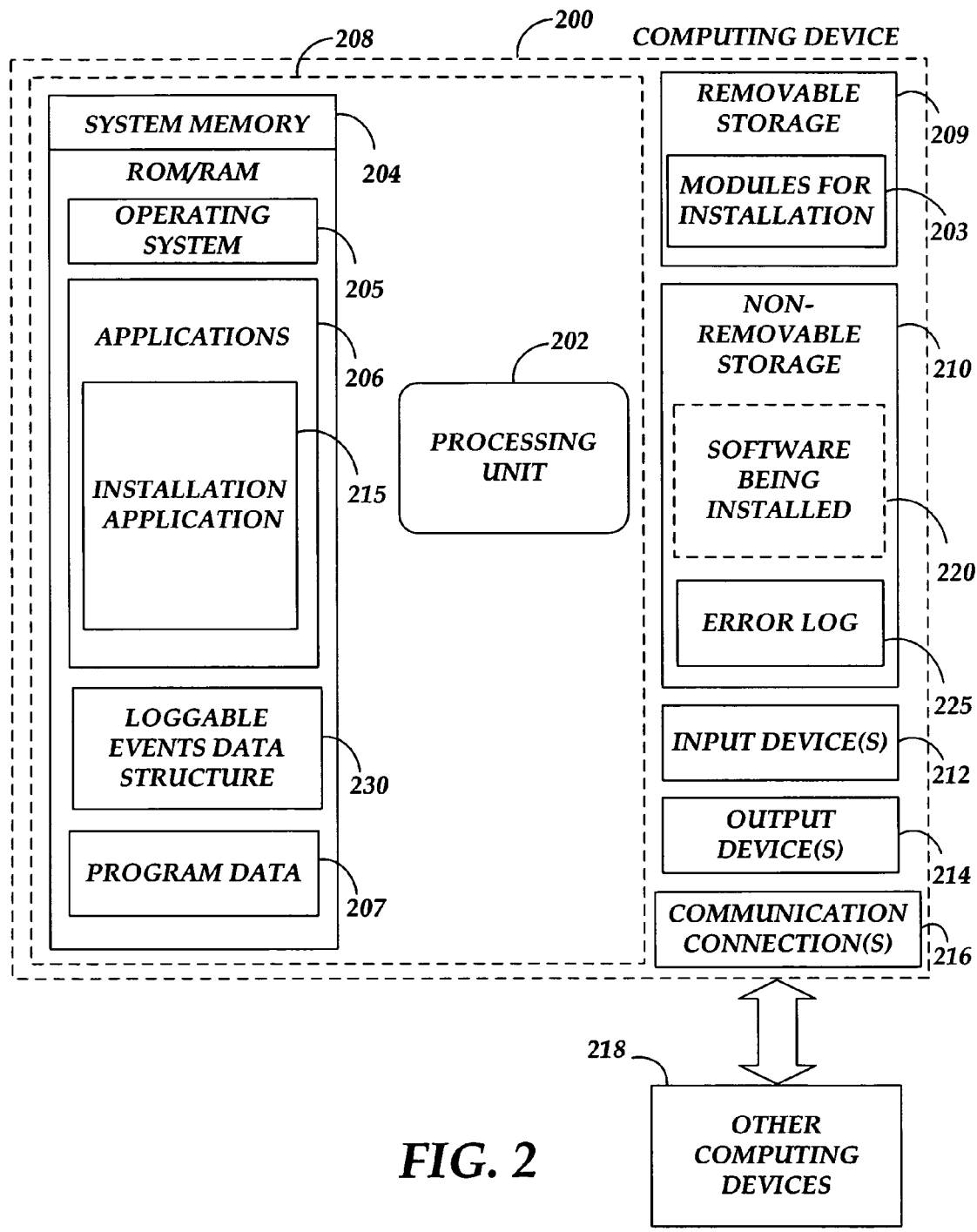
FIG. 2 is a block diagram of a system including a computing device.

FIG. 2 is a block diagram of a system including a computing device 200 consistent with an embodiment of the present invention. Consistent with an embodiment of the present invention, the aforementioned memory storage and processing unit may be implemented in a computing device, such as computing device 200 of FIG. 2. Any suitable combination of hardware, software, and/or firmware may be used to implement the memory storage and processing unit. By way of example, the memory storage and processing unit may be implemented with computing device 200 or any of other computing devices 218, in combination with computing device 200. The aforementioned system, device, and processors are examples and other systems, devices, and processors may comprise the aforementioned memory storage and processing unit, consistent with embodiments of the present invention. Furthermore, computing device 200 may comprise an operating environment for system 100 as described above. System 100 may operate in other environments and is not limited to computing device 200.

With reference to FIG. 2, a system consistent with an embodiment of the invention may include a computing device, such as computing device 200. In a basic configuration, computing device 200 may include at least one processing unit 202 and a system memory 204. Depending on the configuration and type of computing device, system memory 204 may be volatile (such as RAM), non-volatile (such as ROM, flash memory, etc.) or some combination. System memory 204 may include operating system 205, one or more applications 206, and may include program data 207. In addition, system memory 204 may include a loggable event data structure 230 as described in more detail below. Operating system 205, for example, is suitable for controlling computing device 200's operation. In one embodiment, applications 206 may include an installation application 215. Furthermore, embodiments of the invention may be practiced in conjunction with a graphics library, other operating system, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Removable storage 209 may include programming modules for installation 203. Non-removable storage 210 may also include a software being installed 220, for example, by installation application 215 using programming modules for installation 203. Also, non-removable storage 210 may include an error log 225 as described in more detail below. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all examples of computer storage media (i.e. memory storage.) Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. The term computer readable media as used herein may include both storage media and communication media.

As stated above, a number of program modules and data files may be stored in system memory 204, including operating system 205. While executing on processing unit 202, installation application 215 may perform processes including, for example, one or more of the stages of method 300 as described below. The aforementioned process is an example, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
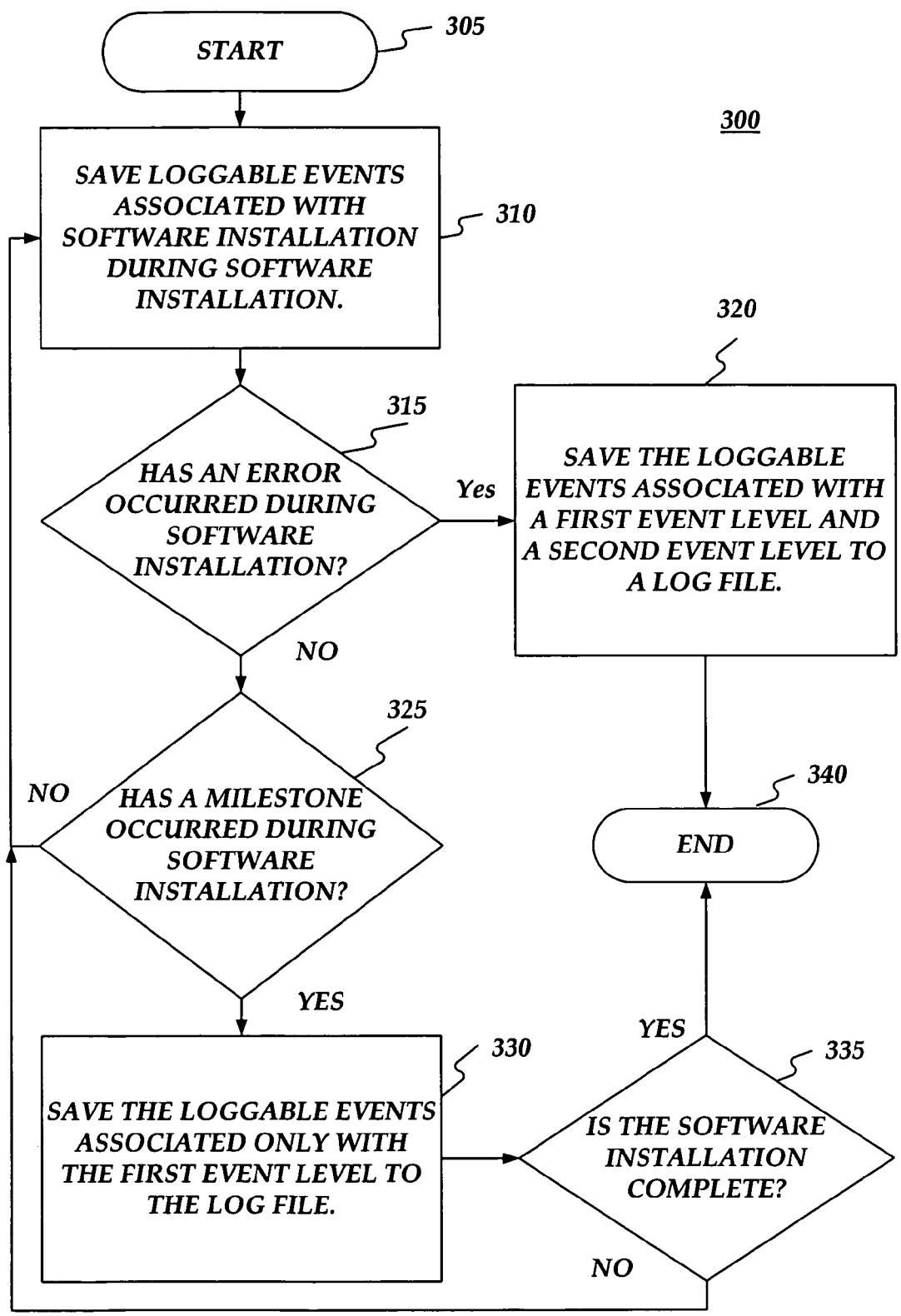
FIG. 3 is a flow chart of a method for providing error logging.

FIG. 3 is a flow chart setting forth the general stages involved in a method 300 consistent with an embodiment of the invention for providing error logging using system 200 of FIG. 2. Ways to implement the stages of method 300 will be described in greater detail below. Method 300 may begin at starting block 305 and proceed to stage 310 where computing device 200 may save loggable event entries associated with software installation during installation of the software. For example, a loggable event entry may comprise a sentence describing a loggable event plus a tag describing the loggable event's level. A loggable event may comprise anything significant that happens during the software installation. For example, a loggable event may comprise, but not limited to, writing a registry key, a file being copied, any internal state changes in computing device 200 or installation application 215, or any decisions made by a user during the software installation (e.g. receiving input from a user.) In addition, loggable events may include anything that may be useful in trouble shooting the software installation process should an error occur during the software installation. The aforementioned are examples and loggable events may comprise any significant operation that may happen during software installation.

From stage 310, where computing device 200 saved the loggable event entries, method 300 may advance to decision block 315 where computing device 200 may determine if an error occurred during the software installation. For example, an error may comprise any event in the software installation that may cause the software installation to fail. In other words, an error may comprise anything that keeps the software from installing on computing device 200. For example, an error may comprise any loggable event failing to happen.

If computing device 200 determined at decision block 315 that the error occurred, method 300 may advance to stage 320 where computing device 200 may save the loggable event entries associated with a first event level and a second event level to error log 225. For example, as stated above, a loggable event entry may include a tag describing the loggable event's level. A particular level may be assigned to a loggable event entry based, for example, upon how important the loggable event is especially in light of whether an error occurred in the software installation. Consistent with embodiments of the invention, the tag may have one of at least two levels, however, more than two levels may be used. A first level may be described as a "standard" level and a second level may be described as a "verbose" level. The first level may correspond to a high level inventory of what happened during the software installation. In addition, the first level may correspond to loggable events, for example, having nothing to do with the software installation's success or failure. For example, the first level may be assigned, but not limited to loggable events describing what packages were installed.

The second level may correspond only to loggable events that may help in diagnosing a problem when an error occurs. Second level loggable events may correspond to more than just a high level inventory of what happened during the software installation. For example, "ticking" a progress bar may correspond to a loggable event being assigned to the second level. In this example, logging events associated with ticking the progress bar may help in diagnosing a problem if the error was due to tracking the installation's progress. In other words, knowing when and how the progress bar was ticked may be important for trouble shooting purposes. In contrast, ticking the progress bar may not correspond to a loggable event being assigned to the first level because, for example, this event deals with the software installation's success or failure. In other words, ticking a progress bar may not be an example of a high level inventory of what happened during the software installation.

The information contained in a loggable event entry's sentence and the level indicated by its corresponding tag may be determined by a programmer when installation application 215 is developed. When an error occurs, the more robust second level events may be saved in error log 225 along with the less robust first level. This may be done quickly before computing device 200 crashes so that error log 225 may be studied latter for possible error diagnosis or debugging.

If, however, computing device 200 determined at decision block 315 that the error did not occur, method 300 may advance to decision block 325 where computing device 200 may determine if a milestone occurred during the software installation. For example, a milestone may comprise a safe point during the software installation. In other words, a milestone may comprise a point in the software installation where all operations up to that point were successful and thus no second level loggable events need to be saved to error log 225. Consistent with embodiments of the invention, milestones may comprise successfully installing a particular programming module, getting a product key from a user running installation application 215, the reception on any particulate user input, the reception of all user input. For example, the milestone may comprise the successful installation of one particular programming module when installation application 215 is installing a suite of programming modules. The aforementioned are examples, and milestones may occur at any point in the software installation.

If computing device 200 determined at decision block 325 that the milestone occurred, method 300 may advance to stage 330 where computing device 200 may save the loggable event entries associated only with the first event level to error log 225. If, however, computing device 200 determined at decision block 325 that the milestone did not occur, method 300 may advance to stage 310 where computing device 200 may continue the software installation and continue saving loggable event entries associated with the software installation to loggable event data structure 230. Stage 310 is described above. After computing device 200 saves the loggable event entries in stage 330, method 300 may proceed to decision block 335 where computing device 200 may determine if the software installation is complete. For example, computing device 200 may determine that software being installed 220 by installation application 215 using programming modules for installation 203 has been complete.

If computing device 200 determined at decision block 335 that the software installation is complete, or from stage 320, method 300 may advance to stage 340 where method 300 may end. If, however, computing device 200 determined at decision block 335 that the software installation is not complete, method 300 may advance to stage 310 where computing device 200 may continue the software installation and continue saving loggable event entries associated with the software installation to loggable event data structure 230. Stage 310 is described above.

Generally, consistent with embodiments of the invention, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering stages and/or inserting or deleting stages, without departing from the principles of the invention.

It is intended, therefore, that the specification and examples be considered as examples only, with a true scope and spirit of the invention being indicated by the following claims and their full scope of equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for providing error logging, the method comprising:
   saving, on a computer, loggable event entries associated with software installation during installation of the software, each of the loggable event entries having one of the following: a first level and a second level;
   saving the loggable event entries associated with the first level and the second level to a log file if an error occurred during the installation of the software; and
   saving the loggable event entries associated only with the first level to the log file if a milestone occurred during the installation of the software and the error has not occurred before the milestone occurs.

2. The method of claim 1, wherein saving the loggable event entries associated with the software installation during installation of the software comprises saving the loggable event entries associated with software installation during installation of the software to a data structure in a volatile memory.

3. The method of claim 2, further comprising clearing the data structure in the volatile memory after one of the following: saving the loggable event entries associated with the first level and the second level to the log file if the error occurred during the installation of the software and saving the loggable event entries associated with the first level to the log file if the milestone occurred during the installation of the software.

4. The method of claim 1, wherein having one of the following: the first level and the second level further comprises having one of the following: the first level corresponding to the loggable event entries associated with a high level inventory of what happened during the software installation and the second level corresponding only to the loggable event entries configured to aid in diagnosing the error.

5. The method of claim 1, wherein saving the loggable event entries associated with the software installation comprises saving the loggable event entries wherein at least one of the loggable event entries is associated with a event comprising one of the following: writing a registry key, copping a file, changing any internal state, and receiving input from a user.

6. The method of claim 1, wherein saving the loggable event entries associated with the first level to the log file if the milestone occurred comprises saving the loggable event entries associated with the first level to the log file if the milestone occurred, the milestone comprising one of the following: successfully installing a programming module, receiving a product key from a user, receiving a user input, and receiving all the user input necessary to install the software.

7. The method of claim 1, further comprising stopping the software installation if the error occurred during the installation of the software.

8. The method of claim 1, further comprising continuing the software installation if the milestone occurred during the installation of the software.

9. A system for providing error logging, the system comprising:

a memory storage; and a processing unit coupled to the memory storage, wherein the processing unit is operative to:

save loggable event entries associated with software installation during installation of the software, each of the loggable event entries having one of the following: a first level and a second level;

save the loggable event entries associated with the first level and the second level to a log file if an error occurred during the installation of the software;

save the loggable event entries associated only with the first level to the log file if a milestone occurred during the installation of the software and the error has not occurred before the milestone occurs;

stop the software installation if the error occurred during the installation of the software; and continue the software installation if the milestone occurred during the installation of the software.

10. The system of claim 9, wherein the processing unit being operative to save the loggable event entries associated with the software installation during installation of the software comprises the processing unit being operative to save the loggable event entries associated with software installation during installation of the software to a data structure in a volatile memory.

11. The system of claim 10, further comprising the processing unit being operative to clear the data structure in the volatile memory after one of the following: saving the loggable event entries associated with the first level and the second level to the log file if the error occurred during the installation of the software and saving the loggable event entries associated with the first level to the log file if the milestone occurred during the installation of the software.

12. The system of claim 9, wherein having one of the following: the first level and the second level further comprises having one of the following: the first level corresponding to the loggable event entries associated with a high level inventory of what happened during the software installation and the second level corresponding only to the loggable event entries configured to aid in diagnosing the error.

13. The system of claim 9, wherein the processing unit being operative to save the loggable event entries associated with the software installation comprises the processing unit being operative to save the loggable event entries wherein at least one of the loggable event entries is associated with a event comprising one of the following: writing a registry key, copping a file, changing any internal state, and receiving input from a user.

14. The system of claim 9, wherein the processing unit being operative to save the loggable event entries associated with the first level to the log file if the milestone occurred comprises the processing unit being operative to save the loggable event entries associated with the first level to the log file if the milestone occurred, the milestone comprising one of the following: successfully installing a programming module, receiving a product key from a user, receiving a user input, and receiving all the user input necessary to install the software.

15. A computer-readable storage medium which stores a set of instructions which when executed performs a method for providing error logging, the method executed by the set of instructions comprising:

saving, to a data structure in a volatile memory, loggable event entries associated with software installation during installation of the software, each of the loggable event entries having one of the following: a first level and a second level;

saving the loggable event entries associated with the first level and the second level to a log file if an error occurred during the installation of the software; and saving the loggable event entries associated only with the first level to the log file if a milestone occurred during the installation of the software and the error has not occurred before the milestone occurs.

16. The computer-readable storage medium of claim 15, further comprising clearing the data structure in the volatile memory after one of the following: saving the loggable event entries associated with the first level and the second level to the log file if the error occurred during the installation of the software and saving the loggable event entries associated with the first level to the log file if the milestone occurred during the installation of the software.

17. The computer-readable storage medium of claim 15, wherein having one of the following: the first level and the second level further comprises having one of the following: the first level corresponding to the loggable event entries associated with a high level inventory of what happened during the software installation and the second level corresponding only to the loggable event entries configured to aid in diagnosing the error.

18. The computer-readable storage medium of claim 15, wherein saving the loggable event entries associated with the software installation comprises saving the loggable event entries wherein at least one of the loggable event entries is associated with a event comprising one of the following: writing a registry key, copping a file, changing any internal state, and receiving input from a user.

19. The computer-readable storage medium of claim 15, wherein saving the loggable event entries associated with the first level to the log file if the milestone occurred comprises saving the loggable event entries associated with the first level to the log file if the milestone occurred, the milestone comprising one of the following: successfully installing a programming module, receiving a product key from a user, receiving a user input, and receiving all the user input necessary to install the software.

20. The computer-readable storage medium of claim 15, further comprising stopping the software installation if the error occurred during the installation of the software.

\* \* \* \* \*